United States Patent

[11] 3,556,553

[72] Inventor Joachim Kolbe
 5126 Haskell Ave., Encino, Calif. 91316
[21] Appl. No. 717,722
[22] Filed Apr. 1, 1968
[45] Patented Jan. 19, 1971

[54] POLYURETHANE CUSHION SUPPORT FOR VEHICLES
 2 Claims, 6 Drawing Figs.
[52] U.S. Cl. .................................................. 280/112,
 267/21, 63, 153
[51] Int. Cl. ...................................................... B60g 11/60,
 B60g 21/00
[50] Field of Search ........................................... 280/124,
 112, 112.1; 267/63, 21, 1R, 153, 141

[56] References Cited
UNITED STATES PATENTS

| | | | |
|---|---|---|---|
| 3,144,247 | 8/1964 | Szonn et al. | 267/63 |
| 3,181,883 | 5/1965 | Kolbe | 280/112(.1) |
| 3,279,779 | 10/1966 | Thomas et al. | 267/63X |
| 3,290,055 | 12/1966 | Kolbe | 280/112 |
| 3,368,806 | 2/1968 | Szonn | 267/63X |
| 3,383,118 | 5/1968 | Kolbe | 280/112 |
| 3,301,385 | 1/1967 | Lambert | 267/153X |
| 3,447,814 | 6/1969 | Siber et al. | 267/63X |

*Primary Examiner*—A. Harry Levy
*Attorney*—Andrus, Sceales, Starke & Sawall

ABSTRACT: A bouncy 70 durometer polyurethane block is employed to support a lever arm at one end of a torsion bar against twist in a vehicle mounting designed to resist outward leaning of the vehicle superstructure upon turns.

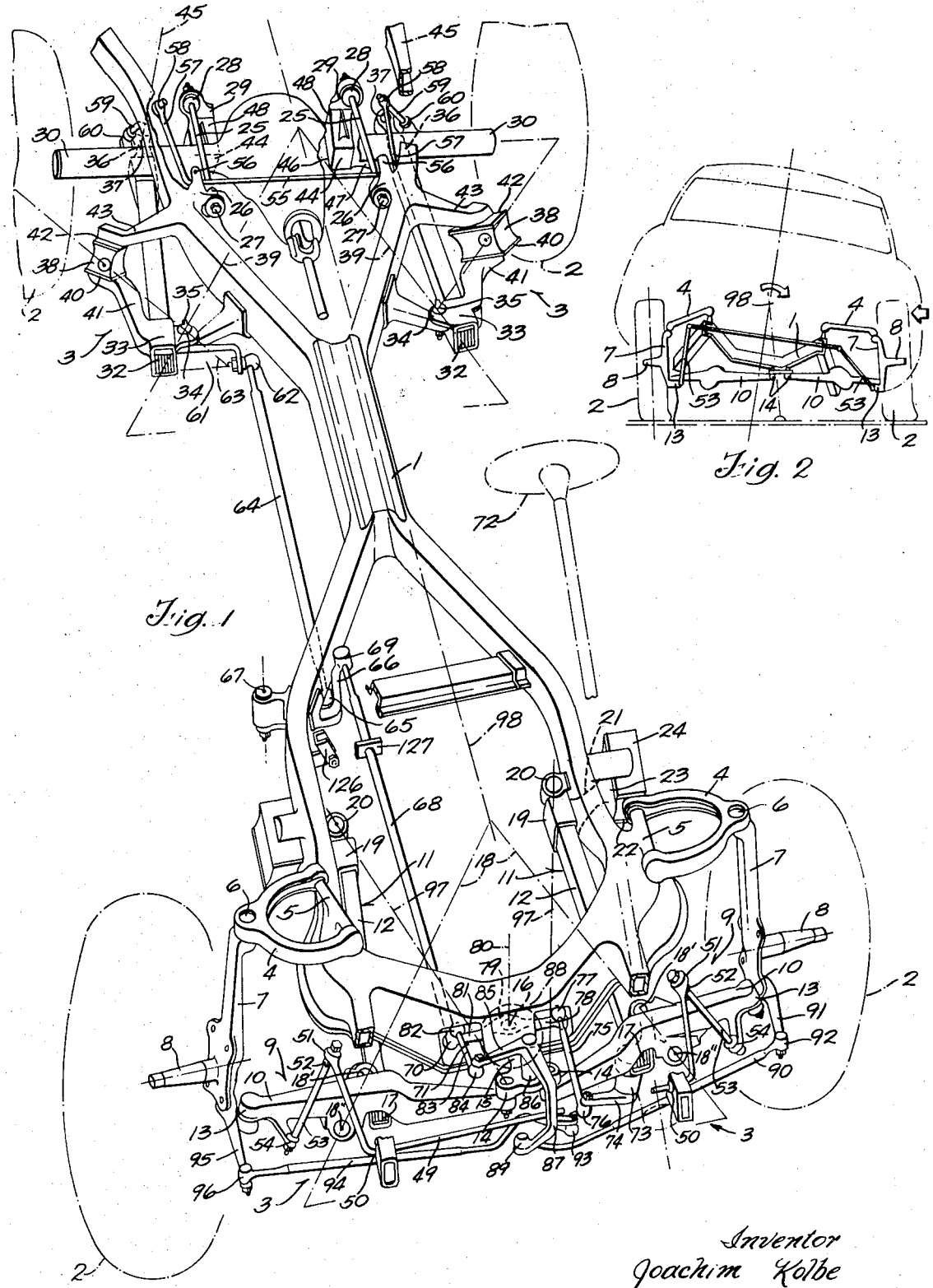

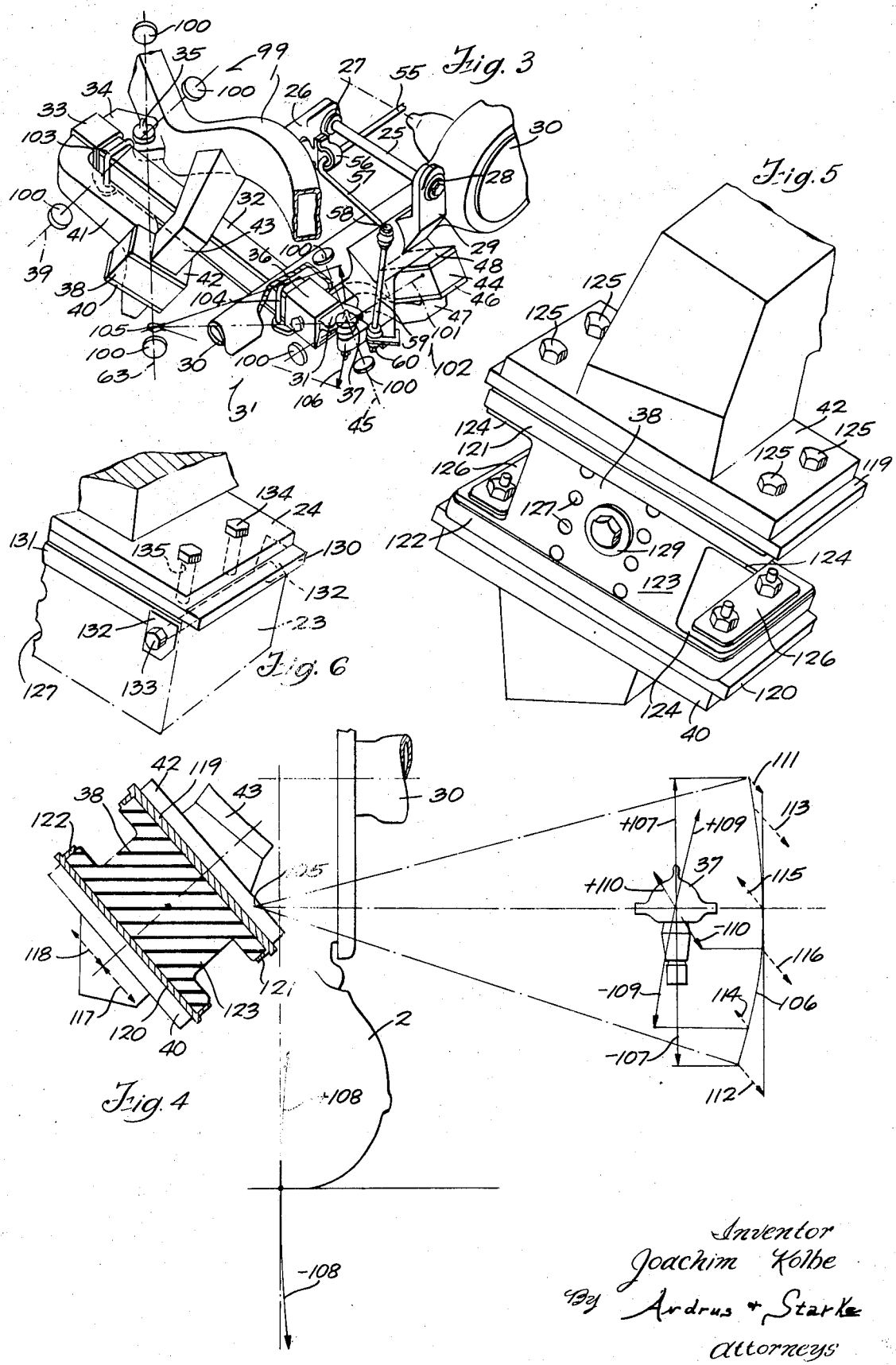

3,556,553

POLYURETHANE CUSHION SUPPORT FOR VEHICLES

This invention relates to an improved suspension for vehicles such as automobiles having resilient means interposed between the wheel supporting means and the vehicle superstructure.

In the construction of curve-bank automobiles, i.e. in which the superstructure is largely prevented from leaning outwardly upon turns in the road, as illustrated in previous patents No. 3,181,883, 3,290,055, and 3,329,233 issued to the present inventor, a rubber block has been employed to support a lever arm at one end of a torsion bar against twist. The positioning of the rubber block and its general mode of operation in the vehicle mounting is set forth in the foregoing patents.

While synthetic rubber blocks have been found reasonably good in providing the desired banking action for the vehicle superstructure upon curves it was found necessary to reinforce the blocks to prevent undue distortion. Such reinforcements resulted in a reduction in the desired soft ride characteristic highly desired in the modern passenger vehicle.

The present invention is based upon the discovery that such reinforcements can be eliminated by the use of multiturn cushions made of polyurethane elastomer and characterized by having a a high rebound characteristic and a high resistance to permanent set, with a resilience approaching that of natural rubber.

The cushion block is free of filler material and preferably has a hardness range of 65 Shore "A" plus or minus 5 and a tensile strength in excess of 4000 pounds per square inch, with a minimum elongation of 600 percent.

Such characteristics have been unattainable with rubber and synthetic compositions heretofore employed.

By reason of the elimination of the heretofore necessary reinforcing of the cushion blocks the present invention provides a mounting system in which the multiturn cushion blocks are free to function resiliently in all directions of movement required of it in a given mounting system, with the result that "washboard" rides are smoothed out and overcome better than with most present day coil spring car mountings and at the same time the lever arm support is more firm thereby providing a safer and better control for the vehicle.

The materials and methods of production of the polyurethane elastomer blocks is much lower in cost than was the case with the rubber blocks formerly used.

Another discovery based upon the present invention is the fact that hydraulic shock absorbers appear to interfere with the functioning of the polyurethane glide cushions, and that the cushion blocks are in essence self-damping and readily take on the functions heretofore provided by such shock absorbers.

Thus, by eliminating the necessity for separate shock absorbers, the employment of polyurethane based cushion blocks provides a mounting system of very reasonable cost.

A third discovery based upon the preset present invention lies in the fact that stronger generally stiffer and a safer tires can be employed without unreasonably diminishing the smooth riding characteristics of the car.

Also, by reason of the more simple construction of the cushion block free from reinforcements it is possible to greatly simplify the mounting for the block.

It has also been found that the use of this new polyurethane base material of single-molecule composition for all of the ball joints in the vehicle mounting gives a greatly improved ride as compared to present day coil spring mountings. Thus, the invention in its broadest sense may be the mounting of the superstructure upon the wheel supports solely by means of resilient connections constructed of polyurethane.

The accompanying drawings illustrate various embodiments of the invention presently contemplated as the best mode for carrying out the invention.

In the drawings:

FIG. 1 is a perspective view of a vehicle chassis embodying the invention and showing the superstructure in a normal upright position;

FIG. 2 is a schematic front elevation of the vehicle having the superstructure mounted as shown in FIG. 1 and turned into a roll banked position;

FIG. 3 is a perspective schematic view of a single rear roll banking arm assembly extending between a frame and a rigid axle mounted in accordance with the invention;

FIG. 4 is an outline of the travel paths of an axle-supported ball joint in relation to the axes of the respective frame-supported banking universal joint, during both the relative banking and the oscillation movements between the ball joint and the banking universal joint;

FIG. 5 is a perspective view of a single glide cushion and its support and anchoring means as mounted within the related carrying structure, embodying the invention; and FIG. 6 is a varied perspective view of a quarter section of a glide cushion and its related support, carrying and anchoring parts.

Before describing the illustrations referred to above, a comparison is made of the characteristics of the proposed polyurethane based glide cushions and the rubber blocks which they are to replace in accordance with this invention. Natural rubber, as extracted from latex obtained directly from the vegetable kingdom has in cured form as gum rubber a hardness of about 25 durometer (ASTM D 676). Any increase in hardness is obtained by adding filler material, such as carbon black, to the gum rubber. The larger the proportion of filler material, the greater the loss of resiliency, unit I finally in the 80 to 90 durometer group, the gum rubber acts mostly as glue for the usually powdered filler material.

Where great compression strength is needed, such as in the application described for curve-bank car rubber blocks, rubber of the necessary hardness loses its needed softness for the required shear motions. It was fort this reason that the many textile inserts described in the U.S. Pat. No. 3,290,005 referred to above were incorporated in the blocks. A reduction from a hardness of 80 durometer to 45 durometer did thereby lead to greater strength in compression and yet acceptable freedom for the required shear motions.

Polyurethane constitutes a scientifically developed uniform molecule structure whereby varying hardnesses are achieved chemically by the uniform composition of varying molecules, each variation designed forth the desired hardness of the block as a whole.

As applied to curve-bank car glide cushions, the absence of filler material in the polyurethane allows greater hardness without impairing resiliency and freedom in shear. A change from 45 durometer to 70—80 durometer eliminates the need for textile inserts, permits a much greater reliance on the increased resiliency for wheel oscillation during both straight ahead and curve ride, as long as the linkage system provides controlled motion for the cushion deformation, especially in shear, in order to actuate the cushions.

It is here that a second large benefit, after the change from rubber to polyurethane, can be derived (is derived) from the curve-bank car structural system itself, besides that of improved banking and inward lean of the superstructure during the curve ride. Rubber blocks, as previously constructed and incorporated into the curve-bank car structure, will, in response to sudden impact operation, resulting from quick wheel oscillation, undesirably resist strongly immediate displacement, due possibly to high break-loose internal friction, as occurs in bronze bearings.

Polyurethane cushions, having only one-tenth of the resistance against shear as against compression, and having certain self-lubricating qualities eliminate such undesirable resistance and actually provide an added resiliency of "velvet support" to the vehicle, as s described hereinafter.

The FIGS. 3 and 4 of this disclosure, illustrating and describing the geometric basis for the new freedom of operation for the polyurethane blocks, where an actual build built-in restriction in operation with the use of rubber blocks occurs, can better be analyzed and understood, when related to FIGS. 1, and 2, which therefore are incorporated into this inventive disclosure. These FIGS. 1 and 2 are illustrated and described in the U.S. patents referred to above.

FIG. 1 illustrates a vehicle body or superstructure having a chassis or body support frame 1 and supported by wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the vehicle.

The front wheels 2 and their corresponding wheel carriers 3 form a front pair of effective multiturn cushion controlled roll banking arms supporting the front end of the superstructure.

Each front wheel carrier 3 comprises an upper control arm 4 pivotally attached to the frame 1 by the substantially longitudinally extending hinge 5 and connected by the ball and socket joint 6 to a wheels supported member 7 which also serves as kingpin member and carries the wheel spindle 8. In addition, each front carrier 3 has a lower suspension arm unit 9 comprising a transversely extending leg 10 and a longitudinally extending leg 11. Leg 11 also serves as a vehicle main support torsion spring for the corresponding share of the weight of the vehicle since the leg 11 comprises the torsion leaf spring bundle 12.

The tranversely extending leg 10 of each lower suspension arm unit 9 is pivoted at its outer end by the universally movable ball and socket joint 13 to the wheel supported spindle member 7, and at its inner end by the universally movable ball and socket joint 14 to a longitudinally extending lever 15 pivoted by a substantially vertically placed pivot 16 to the frame 1. Lever 15 serves both transversely extending legs 10 as a common inner an end support.

The longitudinally extending legs 11 each comprise the torsionally stressed leaf spring bundle 12 anchored at its forward end into the anchor box 17 which forms a hinged fork shaped to provide the related inclined hinge identified by the hinge axis 18 and which serves as a kingpin banking hinge for that section of the vehicle. The hinge may be constructed by placing two ball and socket joints 18' and 18'' spaced apart along its hinge axis line 18.

Kingpin banking hinges and their functions are disclosed and described in Kolbe U.S. Pat. No. 2,739,658, issued Mar. 27, 1956.

The backward end of each torsional leaf spring bundle 12 located at either side of the vehicle is anchored into the corresponding anchor box 19 supported and secured by a ball and socket joint 20 to the frame 1. Each anchor box 19 forms an inter integral part with an outwardly extending support arm 21. The outer end of arm 21 forms a carrier plate 22 extending longitudinally with its surface inclined preferably about 30° to the road and with its surface inclined forward end placed lower than its backward end while the vehicle is viewed in side elevation, and extending substantially horizontally in transverse direction.

The carrier plate 22 carries the multiturn cushion 23 which rests against the frame supported plate 24, which in turn extends substantially parallel to the carrier plate 22.

The positioning of the multiturn cushion 23 in an inclined position results in improved resistance against loss of torsional deflection of the corresponding leaf spring bundle 12 during the banking turn of the superstructure, as described in Kolbe U.S. Pat. No. 3,181,883, referred to above.

The rear axle carriers 3 illustrated in FIG. 1 each comprise an upper torque rod or link 25 connected at its forward end to a bracket 16 on frame 1 by a universally movable joint 27, and at its backward end by means of a universally movable joint 28 and axle bracket 29 to the rigid axle housing 30 respectively.

Each rear carrier 3 further comprises a longitudinally extending torsion leaf spring bundle 32 service as a lower suspension arm and connected at its forward end through anchor box 33 and arm 34 by the ball and socket joint 35 to the frame 1, and at its backward end through the anchor box 36 and arm 31 by the ball and socket joint 37 to the axle housing 30.

Multiturn cushions 38 are placed a selected distance away from and extend with their support surfaces perpendicular to effective roll banking axes 39 which intersect the centers of the corresponding ball and socket joints 35. The lower carrier plates 40 for the multiturn cushions 38 are supported by the arms 41 extending outwardly and rearwardly at approximately 45° from the ball joints 35 located at the forward ends of the torsional leaf spring bundles 32.

The multiturn cushions 38 are supported against upper support plates 42 which are resting against brackets 43 carried by the frame 1.

The multiturn cushions 44, resting against the axle housing 30, are also placed a selected distance away from and extend with their support surfaces perpendicular to effective axle banking hinge axes 45 which intersect the ball joints 37 and constitute the geometric center lines for the relative travel path of the related connecting members between frame 1 and the rearward ends of the rear wheel carriers 3. Each multiturn cushion 44 is supported by the corresponding lower carrier plate 46 which in turn is connected by the support arm 47 to the anchor box 36. The multiturn cushion 44 rests against the upper support plate 48 extending rearwardly from the axle housing 30. The support plate 48 extends substantially parallel to the carrier plate 46 and confines the cushion therebetween.

The multiturn cushions 44 are inclined as described for the cushions 23 arranged in the front of the vehicle and function in a similar manner.

A swaybar 49 is attached in the front of the vehicle to the frame 1 by the bearings 50. The outer ends of the swaybar 49 form longitudinally extending swaybar arms 51 which are connected by pivotal or rubber bearings 52 to inclined swaybar shackles 53. The shackles 53 are connected by pivotal or rubber bearings 54, which are spaced farther apart than the upper shackle bearings 52 to the outer ends of the transversely extending legs 10 of the lower front suspension arm units 9.

In the rear of the vehicle, a similar swaybar 55 may be added and is illustrated as being attached by suitable bearings 56 to the frame 1. The swaybar 55 has longitudinally extending arms 57 on either end, which are connected by upper pivotal or rubber bushings 58 to inclined shackles 59 having lower pivotal or rubber bearings 60 spaced farther apart than the upper pivots 58 and connecting the shackles 59 to the rear axle housing 30.

The front and rear wheel carriers 3 are connected to operate in unison in curve-banking, as shown in earlier disclosures such as Kolbe U.S. Pat. No. 2,788,984.

For this purpose the rear suspension forward anchor box 33 located on the right side of the vehicle in the embodiment shown in FIG. 1 carries an arm 61 extending inwardly with the ball and socket joint 62 on its end placed in or near the theoretical axis 63 which extends through the rear frame supported ball and socket joint 35 and through the approximate center of the multiturn cushion 38. This arm 61 constitutes pairs of wheels 2 to secure proper track holding for the vehicle.

A longitudinally extending tie rod 64 carries at its rear end the ball and socket joint 62 and at its forward end a ball and socket joint 65 which is carried by the substantially horizontally and transversely extending lever 66 disposed to turn about a substantially vertically extending pivot 67 supported by the frame 1.

A second longitudinally extending tie rod 68 carrying at its rear end the ball and socket joint 69 which is also supported by the lever 66 and carrying at its forward end the a ball and socket joint 70, interconnects the lever 66 and the transversely extending lever 71, which forms a bellcrank portion of the centrally located lever 15 in the front of the vehicle.

FIG. 1 further illustrates the steering assembly for the vehicle comprising a steering handwheel 72 which operates a steering gear unit 73 carried by the frame 1 and supporting a Pitman arm 74 extending transversely of the direction of the vehicle. A substantially longitudinally extending drag link 75 is connected by a ball and socket joint 76 on its forward end to the outer end of the Pitman arm 74 and at its rearward end by a ball and socket joint 77 to the outer end 78 of one of a transversely extending two-arm lever 79 which pivots about the centrally located substantially vertically extending axis 80 of hinge 16 carried by the frame 1.

The other outer end 81 of the lever 79 is connected by a ball and socket joint 82 to a substantially longitudinally extending drag link 83, hereinafter called banking drag link, which in turn is connected by the ball and socket joint 84 to the sidewardly extending lever arm 85 of the bellcrank 86 which comprises also the longitudinally extending lever arm 87 and which pivots about the vertically extending bellcrank pivot 88 in turn supported by the longitudinally extending centrally placed suspension arm 15 at its outer end.

The lever arm 87 carries one side of its downwardly extending forward section the ball and socket joint 89 supporting the steering tie rod 90 connected to the steering arm 91 by the ball and socket joint 92, and carries on the other side of its downwardly extending forward action the ball and socket joint 93 supporting the steering tie rod 94 connected to the steering arm 95 by the ball and socket joint 96. The steering tie rods 90 and 94 are shaped to secure swinging freedom for an overlapping condition, necessitated by the steering geometry.

In the operation of the curve-bank superstructure and the suspension mechanism illustrated in FIG. 1 and partly shown as moved into the curve-banked position in FIG. 2, the right-hand front swaybar shackle 53 has erected itself and lifted the right-hand side of the superstructure supported by its frame 1, turning it around the predesigned effective banking roll center 98 away from the road, while the left-hand front swaybar shackle 53 has the left-hand side of the superstructure pulled downwardly, also turning it around the banking roll center 98.

Similar turn and shift motions take place throughout the mechanism as described in detail in Kolbe U.S. Pat. No. 3,181,883, referred to above.

FIG. 3 illustrates the left rear roll banking arm 3 of the vehicle chassis illustrated in FIG. 1 as viewed from the rear. Identical reference characters identify identical structural members and geometry outlines in FIG. 3 as well as in FIGS. 4 and 5, described hereinafter. These figures are presented to illustrate that with application of a suitable material for the cushions the curve-bank car linkage structure is capable of expanding its value by contributing an entirely new bed of resiliency, separate from the torsionally operated spring bundles 32, because the shear motions needed to secure curve-banking are additionally made fully available in response to wheel oscillation.

While heretofore a ride could be secured for curve-bank cars as disclosed in the patents cited, which was considered acceptable essentially for harsher riding sports cars only, it is now possible to combine a velvet ride of the highest family car quality with a strong main spring support, improving steering and handling further and contributing greatly to increased safety and freedom from car sickness for driver and passengers.

FIG. 3 also illustrates the positions of the geometrically important axes 39 and 63 which form the banking universal joint 99 as created by the ball and socket joint 35 and the polyurethane glide cushion 38 spaced to secure the positions. All geometry related axis outlines in FIG. 3 are illustrated with identification disc 100 to enable the viewer to more readily recognize their positioning within the perspective illustration.

The post positions of the axes 45 and 101 of the axle-supported banking universal joint 102 formed by the ball joint 37 and the related guide cushion 44 are similarly illustrated and identified.

U-bolts 103 and 104 further secure the torsionally operated leaf spring bundle 32 to the forwardly located anchor box 33 and the backwardly located anchor box 36 respectively.

Whenever the rigid rear axle 30 oscillates out of its static position relative to the superstructure, a movement of the axle-supported ball joint 37 along related arcs takes place, whereby the travel paths depend on whether the axle-supported left wheel 2, the right wheel 2 or both wheels move upwardly or downwardly in response to road surface changes.

Any such travel of the ball joint 37 will result in a pivotal turn about both the banking hinge axis 39 ad and a simultaneous turn about the oscillation hinge axis 63 of the banking universal joint 99. A frozen banking hinge axis 39 would make a true vertical simultaneous travel of both rear axle supported ball joints 37, as appearing in rear elevation, impossible, since the left-hand ball joint 37, as illustrated in FIG. 3, for instance, can turn only about point 105 located on the oscillation axis 63 at its shortest distance from ball joint 37 and along the arc 106, as illustrated. Only an additional simultaneous turn about the banking hinge axis 39 will permit the ball joint 37 to move into the desired vertical plane extending parallel to the longitudinally extending vertically erected main center plane of the vehicle.

FIG. 4 illustrates selected travel paths of the ball joint 37 and the resulting amounts of displacements of the lower cushion support carrier plate 40, stressing the cushion 38 in shear.

Where both axle-supported wheels 2 move simultaneously 4½ inches upwardly or 5½ downwardly, +107 and −107 travel paths will result. Where only the left-hand wheel 2 as shown, turning about the road contact point of the right-hand hand wheel, moves upwardly or downwardly the same respective distances a left wheel road contact point travel path +and −108 is shown resulting in a respective ball joint 37 travel path +and −109. Where only the related right-hand wheel 2, not shown, turning about the road contact point the left-hand wheel 2, as shown, moves upwardly or downwardly the same respective distances, a respective ball joint 37 travel path +and−110 will occur.

Controlled by the newly introduced polyurethane glide cushions 38 firm in compression but soft in shear operation, the lateral differences between the outward travel components of the arc 106 and the illustrated travel paths 108, 109, and 110 call for compensatory turns of the ball joint 37 about the banking hinge axis 39 as stated previously. The lengths of the related turns are increased by about 50 percent due to the inclination of the glide cushion 38 as shown in its true side elevation in the left-hand section of FIG. 4. The final travel shifts for the respective movements of the cushion carrier plate 40 are shown on the right-hand section of FIG. 4, where shift lll relates to "both wheels up" movement, shift 112 to "both wheels down" movement, shift 113 to the "left wheel up" movement, shift 114 to the "left wheel down" movement, shift 115 to the "right wheel up" movement, and shift 116 to the "right wheel down" movement.

The two maximum travel paths 117 and 118 for the lower carrier plate 40 relative to the upper support plate 42, as they result from left turn and right turn moves off the vehicle into the curve-banked post positions, illustrate that the polyurethane glide cushions are operated during wheel oscillation over the full range of movement made available for banking, shifting plate 40 forwardly or backwardly as indicated by the arrowheads attached to the ends of the shift outlines 111 to 116.

However, only a composition and construction of the glide cushions provide providing the necessary freedom of performance will secure the benefits of velvet ride, increased damping, improved road holding, elimination of tire squeal and the other advantages cited above.

The construction and mounting of a typical polyurethane based glide cushion 38 is shown in FIG. 5 as well as indicated in FIG. 4 in the sectional view through the cushion 38. Positioned between the upper support plate 42 and the lower carrier plate 40, the cushion 38 is first placed between an upper mounting plate 119 and a lower mu mounting plate 120. Both mounting plates are provided with edge frames 121 and 122 to give an enclosure support for the upper and lower surface sections of the cushion 38. The plates 119 and 120 are hereinafter referred to as rim plates.

Extending from the four corners of the polyurethane main cushion block 123 are flanges 124 extending along the width of the cushion. Bolts 125 extending through the flanges 124 secure a firm connection between the cushion 38, the rim plates 119 and 120 and the carrier plate 40 and support plate 42 respectively with common washer plates 126 for the pairs of bolts 125 placed as illustrated.

Where it becomes desirable to further decrease resistance against shear motion for the cushion, the cushion block 123 can be separated into two or more vertically extending sections by the drilling of holes 127 or slots of suitable but essentially vertically extending shapes. A further control for height and firmness of the block 123 can be secured by the insertion of a centrally located control bolt 128 with washers of selected diameter 129 on both ends of the bolt placed between the respective sides of the cushion cube and the head and closing nut of the related bolt.

FIG. 6 illustrates a quarter section of a polyurethane glide cushion 23 as placed into the front suspension of the vehicle illustrated in FIG. 1. An upper mounting plate 130 with rim enclosure 131 carries support flaps 132 forming a part of the rim enclosure and carrying the cushion corner bolt 133 which intersects the transversely extending corner section of the cushion 23, to provide a firm connection between cushion and mounting plate 130. This mounting plate in turn is bolted by the connecting bolts 134 to the cushion support plate 24, which is provided with holes 135 through which the threaded bolts 134 are inserted to be screwed into the respective tapped holes of the mounting plate 130.

Although the cushions 23 will in service be under constant high pressure exerted by the superstructure weight, the proposed continuous anchoring from the carrier plate 22 to the support plate 24 on all four corners of the related parts is desirable where the available space for the cushions is taken up by the full length of the uncut cushion block, with small amounts of polyurethane material removed only for the holes 135 and any desire shear resistance regulating holes 127 as described above.

The greater the amount of polyurethane material incorporated into the suspension system with its durometer of hardness raised and adjusted to still secure the best possible banking and oscillation performance, the greater the resistance to high frequency vibrations will be. Since only 5-inch cushion length is incorporated in the front suspension for every 12 inch of combined from frame and axle supported cushion length incorporated into the rear suspension in the design illustrated in FIG. 1 for instance, and since greater vibration occurrence can be expected from the greater number of linkage members comprising the front suspension under consideration also of its added steering linkage, the mounting arrangement for the blocks illustrated in FIG. 6 also constitute added a safety for the vehicle.

The freedom of operation of the cushions 38 as illustrated in FIG. 1 for the benefit of improved wheel oscillation and ride will to a smaller extent be effective also for the cushions 44 in the area and 23 in the front of the vehicle but will become more effective as the fore and aft distance in longitudinal direction between the respective cushion centers and the related ball joints increases, creating increased shear travel paths for the respective cushions.

In every polyurethane glide cushion incorporated into the suspension on linkage an additional important swivel action will take place in a longitudinal and transverse direction and to a smaller extend extent around the respective vertical center axis during the oscillation of the wheels as well as during the vehicle curve-bank action. Such swivel action of the lower carrier plates remaining essentially in a parallel position relative to the spring bundles 32 in the rear and bundles 12 in the front, swinging into an inclined position with the upper support plates remaining stationary, will additionally exert resilient resistance as well as important and progressively occuring damping control within the system and give additional benefits, where polyurethane cushions are incorporated into the suspension linkage of the vehicle.

I claim:

1. In a vehicle of the class described having a superstructure, a banking support for the superstructure and comprising a plurality of cooperating roll banking arms, each including a torsion spring member connecting the superstructure to the unsprung mass of the vehicle, a lever arm at one end of said torsion spring member bearing against a resilient multiturn cushion of polyurethane based material of a durometer hardness of the order of from 70 to 80 and normally compressed under the load of said superstructure, and a ball joint offset from said cushion at the corresponding end of said torsion spring member and constituting the connection therefor to the superstructure to thereby control the roll movement of the superstructure at all times, said resilient multiturn cushion of polyurethane based material being disposed to operate asymmetrically in both compression and shear in response to and as a function of the torsional deflection of said torsion spring member.

2. In a device of the class described having a plurality of torsion springs with their opposite ends secured to corresponding support members by universally movable ball joints and lever arms connecting the spring to the corresponding support member in a manner to effect torsional actuation of the spring by relative movement of the support members in a plurality of directions, one of said support members constituting an unsprung mass disposed to be driven over a road having a straight and curved portions therein, and the other of said support members constituting a sprung mass carried by said first named support members and subjected to forces arising from acceleration and deceleration, uneven roadbeds and from curves in the road, each said torsion spring comprising a tightly arranged multiple leaf spring having a rectangular box encasing the same at least one end, said box carrying the necessary support lever arm connections for the corresponding end of said springs, and a multiturn cushion incorporated in each of said lever arm connection to reduce the tendency for distortion of the torsion spring and to provide greater stability for the spring mass under lateral forces on curves, said multiturn cushion being constructed wholly of polyurethane based material having a durometer in excess of 45, and disposed to operate asymmetrically in both compression and shear in response to and as a function of the torsional deflection of said torsion springs.

UNITED STATES PATENT OFFICE
CERTIFICATE OF CORRECTION

Patent No. 3,556,553                                                          January 19, Joachim Kolbe It is certified that error appears in the above identified patent and that said Letters Patent are hereby corrected as shown below:

Column 1, line 55, cancel "preset"; line 56, after "and" and before "safer" cancel "a". Column 2, line 28, "unit 1" sho read -- until --; line 34, "fort" should read -- for --; line "forth" should read -- for --; line 69, after "as" cancel "s"; line 72, cancel "build". Column 3, line 1, before "illustrated insert -- also --; line 16, "wheels" should read -- wheel --; line 17, before "kingpin" insert -- a --; line 25, "tranverse should read -- transversely --; line 32, after "inner" cancel "an"; line 49, cancel "inter"; line 66, "16" should read -- 26 line 70, "service" should read -- serving --. Column 4, line 6 cancel "a". Column 5, line 63, "disc" should read -- discs --; line 65, cancel "post". Column 6, line 4, after "39" cancel "ad" line 23, after "5 1/2" insert -- " --; line 25, cancel "hand", second occurrence; line 30, after "point" insert -- of --; line 53, "off" should read -- of --; line 62, after "cushi cancel "provide"; line 71, after "lower" and before "mounting' cancel "mu". Column 7, line 6, "paris" should read -- pairs -- line 37, "desire" should read -- desired --; line 45, after "combined" cancel "from"; line 51, after "added" cancel "a". Column 8, line 3, after "suspension" cancel "on"; line 5, afte "smaller" cancel "extend"; line 41, after "having" cancel "a"; line 51, "connection" should read -- connections --.

Signed and sealed this 29th day of June 1971.

(SEAL)
Attest:

EDWARD M. FLETCHER, JR.                                    WILLIAM E. SCHUYLER,
Attesting Officer                                                    Commissioner of Pate